Dec. 5, 1967 E. J. MULLIGAN 3,355,932
METHOD AND APPARATUS FOR TESTING WATERPROOF WATCHES
Filed Sept. 13, 1965 4 Sheets-Sheet 2
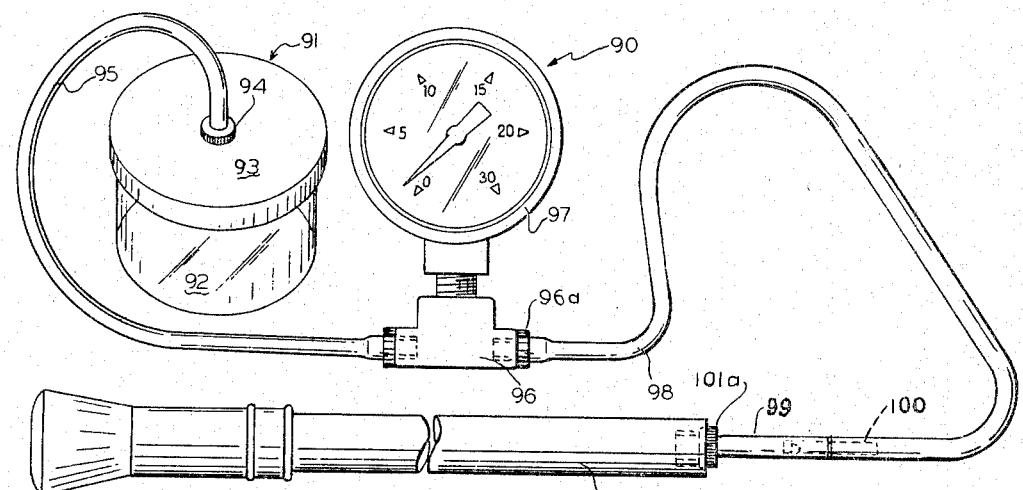
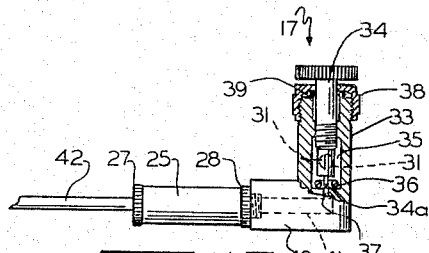
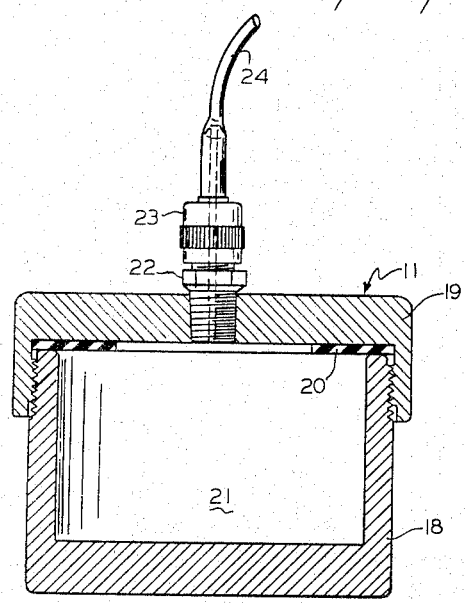
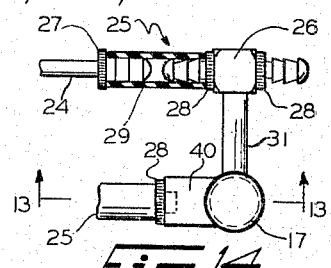
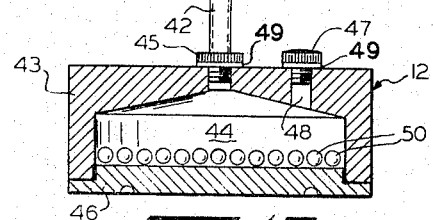
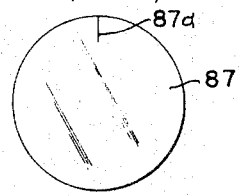
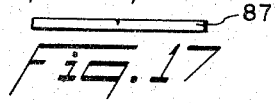
INVENTOR.
EDWARD J. MULLIGAN
BY Bruns and Jenney
Attys.

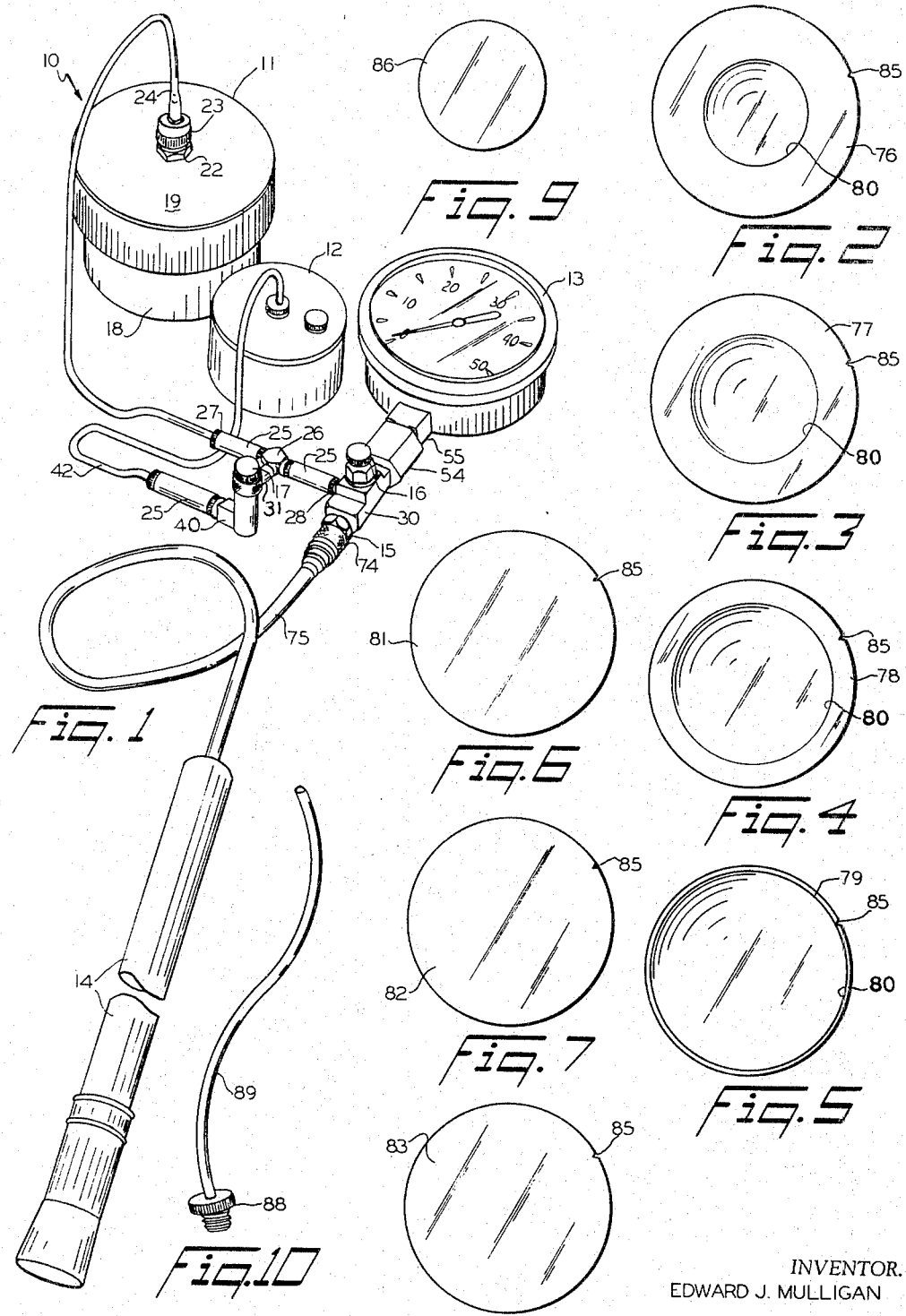

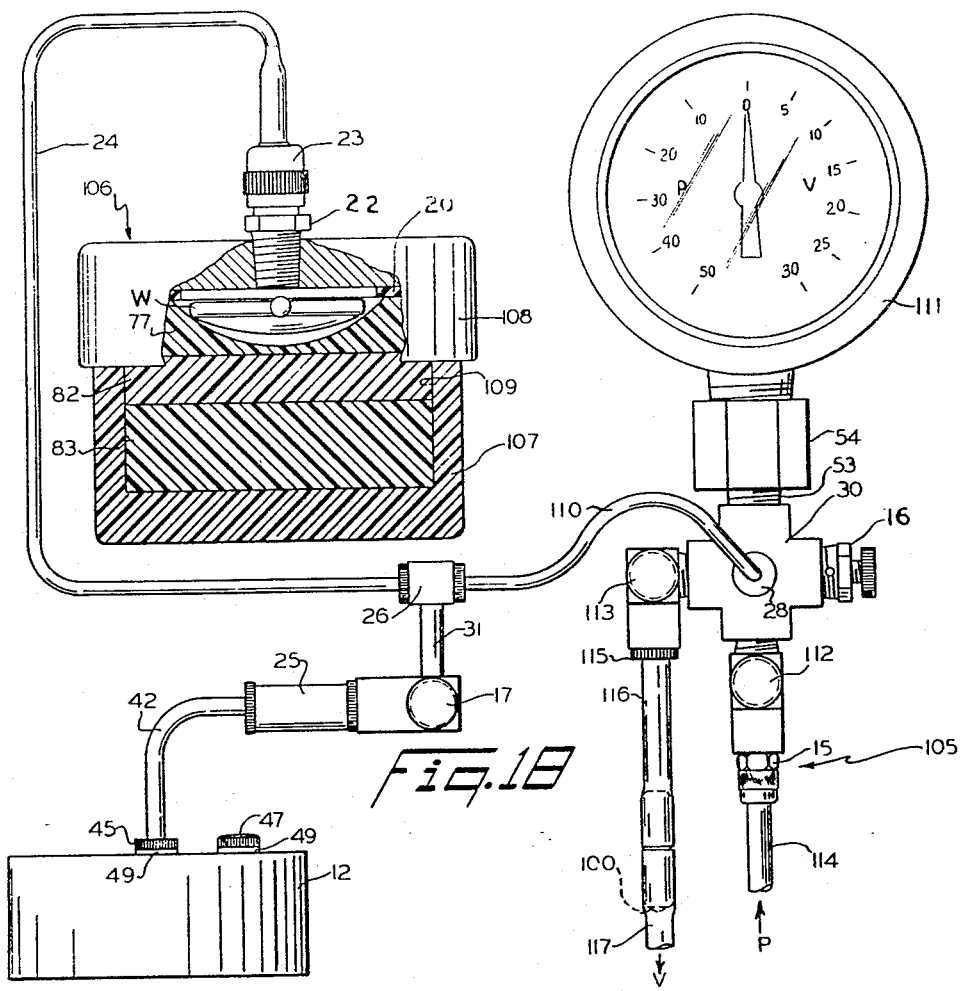
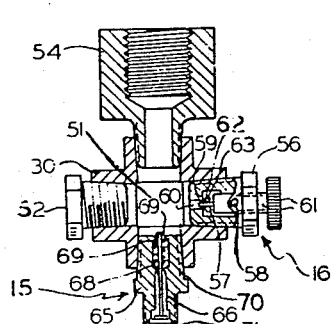
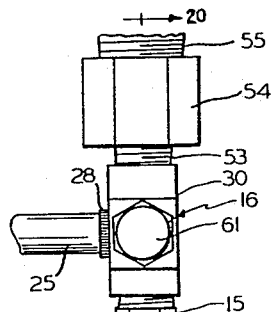
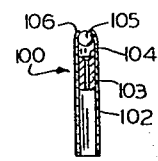
INVENTOR.
EDWARD J. MULLIGAN

Dec. 5, 1967  E. J. MULLIGAN  3,355,932
METHOD AND APPARATUS FOR TESTING WATERPROOF WATCHES
Filed Sept. 13, 1965  4 Sheets-Sheet 4

INVENTOR.
EDWARD J. MULLIGAN
BY Bruno and Jenney
Attys

United States Patent Office 3,355,932
Patented Dec. 5, 1967

3,355,932
METHOD AND APPARATUS FOR TESTING
WATERPROOF WATCHES
Edward J. Mulligan, 101 Clark St.,
Syracuse, N.Y. 13210
Filed Sept. 13, 1965, Ser. No. 486,730
4 Claims. (Cl. 73—49.3)

ABSTRACT OF THE DISCLOSURE

Apparatus including a small chamber with exhaust valve and means for subjecting it to pressure or vacuum through check valves. Conduits connect the chamber to a pressure gage and to first and second tanks, the conduit between tanks having a shut-off valve. The first tank is adapted to closely contain a watch and the watch, first unsealed and then sealed may be subjected to a chosen pressure, the tanks then connected, and the pressure drops noted and compared, or the watch may be subjected to vacuum. The second tank has means for connecting it to a watch interior through its stem.

---

This application relates to watch testing apparatus and more specifically to apparatus for gas-pressure testing of waterproof watches.

Contact with any liquid, whether by immersion or coating, involves a risk of either functional or material damage to the watch movement should liquid enter the case, during or immediately following testing.

The primary object of the present invention, accordingly, is to provide apparatus for testing watches under air or gas pressure to determine if the watch is leakproof without exposing the watch movement to risk of entry of liquid therein.

Another important object is to provide such apparatus in which various sizes and makes of watches can be gas-pressure tested without the necessity of knowing the actual or relative volumes of the apparatus or watches being tested.

Still another object is to provide such apparatus for gas-pressure testing of watches to provide an accurate indication of the size of the leak.

A further object is to provide such apparatus which may also be used for other tests to determine the exact location of leaks.

A still further object is to provide such apparatus which is portable, convenient, and which can be economically made and operated.

Other objects and advantages will appear from the following description in conjunction with the appended drawings, in which:

FIGURE 1 is a perspective view of one form of apparatus for the gas-pressure testing of leakproof watches;

FIGURES 2–9, inclusive, are plan views of insert members selectively used therewith;

FIGURE 10 is a perspective view of accessory apparatus for use therewith for leak-locating tests;

FIGURE 11 is a perspective view of another form of apparatus for testing watches under pressures less than atmosphere;

FIGURE 12 is a longitudinal sectional view of the test tank of FIGURE 1;

FIGURE 13 is a side elevational view partly in section on the line 13—13 of FIGURE 14;

FIGURE 14 is a plan view, partly in section of the gate valve and associated parts of FIGURE 1;

FIGURE 15 is a longitudinal sectional view of the comparator tank of FIGURE 1;

FIGURE 16 is a plan view, and FIGURE 17 is an elevational view of an index plate for use with the pressure gage of FIGURE 1;

FIGURE 18 is a diagrammatic view, partly in section of another form of the complete apparatus for testing watches;

FIGURE 19 is a plan view of the exhaust valve and associated parts of FIGURE 1;

FIGURE 20 is a sectional view on the line 20—20 of FIGURE 19;

FIGURE 21 is a longitudinal sectional view of the check valve of FIGURE 11;

Figure 30:
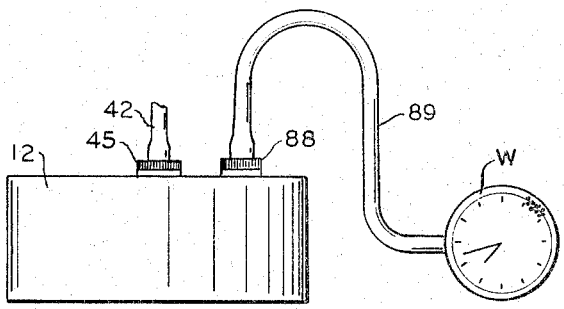
Figure 31:
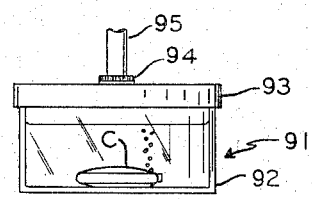
Figure 32:
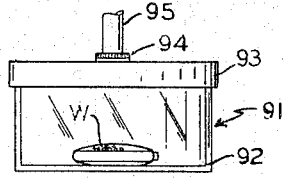
Figure 33:
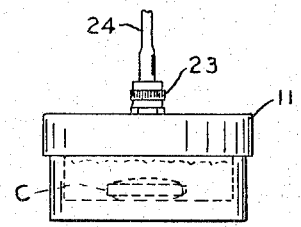
Figure 34:
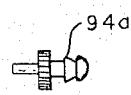

FIGURES 22–29, inclusive, are side elevational views respectively of the inserts of FIGURES 2–9, inclusive;

FIGURE 30 is a diagrammatic view of the accessory of FIGURE 10 in use in a test;

FIGURES 31 and 32 are diagrammatic views of the test tank of FIGURE 11 in use in different tests;

FIGURE 33 is a diagrammatic view of the test tank of FIGURE 1 in use in another test; and FIGURE 34 is an elevational view of an adapter nipple used with the apparatus of FIGURE 10.

FIGURE 1 shows apparatus 10 for pressure testing watches comprising a test tank 11, a comparator tank 12, a pressure gage 13, and a pressure pump 14, interconnected by conduit means including a check valve 15, an exhaust valve 16, and a gate valve 17.

The test tank 11, best seen in FIGURE 12, comprises a vertical-walled, cylindrical, brass receptacle 18 in threaded engagement with a brass cover 19. A flat annular "Neoprene" washer seal 20 between the sidewall top of the receptacle and the flat inside surface of the cover enables the interior 21 of the tank 10 to maintain pressures exceeding 50 p.s.i. A special lubricant between washer 20 and the cover 19 has the property of solidifying at room temperatures and liquifying under higher temperatures caused by friction and pressure. Hand tightening the cover 19, therefore, lubricates the junction between seal and cover but the lubricant is sufficiently viscous to keep the seal attached to the cover when it is removed from the receptacle.

A nipple 22 in the center of the cover provides an air passage into the interior 21 of the tank and a screw coupling 23 removably secures the length of brass tubing 24 in sealed engagement with the nipple 22.

At the other end of tubing 24 a flexible joint 25, as best seen in FIG. 14, is formed with the T 26. The end of tubing 24 is provided with a nipple 27 soldered to the end of the tubing and another nipple 28 is in threaded and soldered engagement with the T 26. Nipples 27 and 28 are connected in close proximity to, and in prolongation of one another, by a short length of "Neoprene" tubing 29 which fits closely over the nipples.

The T 26 is connected by another flexible joint 25 to a cross 30 containing the exhaust valve 16 and another nipple 31 connects T 26 to gate valve 17, as best seen in FIG. 14.

The gate valve 17 has a cylindrical body portion 33 into which is threaded the knurled handled stem 34 having at its end an annular seat around an axially projecting pin 34a. Body 33 has a central chamber 35 in communication with the nipple 31 and the chamber bottom is provided with an O-ring centered around the valve passage 37 into which the axially projecting pin 34a may slide. When the stem 34 is screwed down against the O-ring 36, communication between chamber 35 and the passage 37 is effectively sealed.

A screw-on cap 38 at the top of body 33 holds another O-ring in sealed engagement with the upper portion of stem 34 effectively sealing the chamber 35 from atmosphere.

The lower end of body 33 is provided with a square laterally projecting lug 40 having a passage 41 therethrough in communication with valve passage 37. Another nipple 28 threaded and soldered into passage 41 forms part of another flexible joint 25 connecting passage 41 to another length of brass tubing 42 leading to the comparator tank 12.

Tank 12, as best seen in FIG. 15, has a hollow brass top 43 whose interior chamber 44 has a sloping roof and the center of the top is provided with a nipple 45 connecting tubing 42 with the chamber 44. The bottom of the tank is sealed by a brass plug 46 which is silver brazed to the top 43 to insure a sealed chamber 44.

Screw plug 47 in the top 43 is removable to provide a passage 48 into the chamber 44 and both nipple 45 and plug 47 are provided with sealing washers 49.

In chamber 44 a plurality of metal balls 50 may be removed or added to through the passage 48 or by removing nipple 45, for a purpose hereinafter explained.

The cross 30, which is connected to the T 26 by the flexible joint 25, has a screw nipple 28 for that purpose threaded and soldered into the side thereof, as best seen in FIG. 19, communicating with the central chamber 51 of the cross shown in FIG. 20. One of the four passages of the cross has a plug 52 sealing the passage and providing a flat surface upon which the cross rests.

Another passage is provided with a nipple 53 having a screw cap 54 for sealed connection to the nipple 55 of the conventional pressure gage 13. Pressure gage 13 is responsive to pressures up to 50 p.s.i.

A third passage is provided with the exhaust valve 16, as best seen in FIG. 20. The exhaust valve has a hollow body portion 56 threaded into the cross 30. Body 56 has a central chamber 57 with a small port 58 leading to atmosphere and terminates at one end in a seat 59 around the valve passage 60 leading to the chamber 51 of the cross.

A knurled handled valve stem 61 is threaded into the body 56 and has a flat annular end around an axially protruding pin 62. Carried on the pin 62 is a small O-ring 63 which may be forced against the seat 59 to seal the valve passage 60 from the central chamber 57.

In the fourth passage of the cross 30 the check valve 15 is threadedly engaged. The body 65 of the check valve has an elongated passage 66 in which a "Schrader" type valve, with stem 67, is secured. The central enlarged gasketed valve 68 is carried on stem 67 and normally is sealed against an appropriate shoulder in the passage 66. Between the enlarged inner end 69 of the stem 67 and the valve 68, a spring 70 biases the valve against its shouldered seat. The other end of stem 67 has the usual threaded annular plug 71 for securing stem 67 in passage 66.

The projecting end of the check valve 15 is threaded at 73 and screw cap fitting 74, as shown in FIG. 1, connects this end of the valve with a length of flexible plastic tubing 75 leading to the pump 14, which is of the conventional hand-operated bicycle type.

It will be noted that test tank 11, comparator tank 12, and gage 13 are all flat-bottomed to assure stability on the bench or shelf top used for testing. Cross 30 has the flat-headed plug 52 threaded therein at the bottom to provide a support surface in the same plane as the gage bottom to assure stability of the cross and associated parts. The connections between cross 30 and the T 26 are somewhat above the support surface, but the bottom end of gate valve 17 and its flat lug 40 rest flatly on the support surface. Tube 42 has a loop adjacent its flexible joint connection to the gate valve 17 which normally lies flat on the support surface and helps to support the gate valve upright together with the other flexible joint connections thereto.

Similarly, tube 24 between test tank 11 and T 26 has a loop which normally rests on the support surface and stabilizes the T 26 and associated parts. Thus the entire apparatus assembly is self supporting and maintains its positioned arrangement but requires no mounting of any kind.

It will be noted that the rigid metal tubing connected to tanks 11 and 12 can be raised to permit removal of either without disturbing the rest of the apparatus because of the flexible joints 25 which can bend. The joints 25, however, are normally held straight by the resiliency of the "Neoprene" tubes 29. The area of "Neoprene" tubing exposed to the sealed compressed air volume of the apparatus in minimal, hence no discernible variations in pressure indication occur due to tubing expansion.

As hereinafter more fully described, the test tank 11 is not usually employed empty but has therein a plurality of selectively chosen, solid, space filling, volumetric inserts to cut down the air or gas-permeable space within the tank interior 21 around the watch to be tested. FIGURES 2, 3, 4 and 5 (and FIGS. 22, 23, 24 and 25) show a plurality of container inserts 76, 77, 78 and 79 each contoured to fit closely within the tank interior and each having a hemispherically hollowed-out depression 80 in the top surface thereof. The depression 80 of each container insert is of different size so that the container insert whose depression most nearly fits around the watch to be tested may be chosen.

Figure 22:
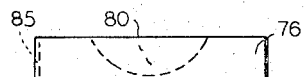
Figure 23:
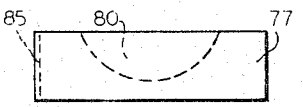
Figure 24:
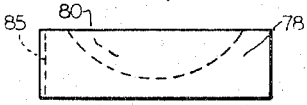
Figure 25:
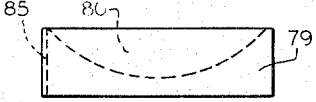
Figure 26:
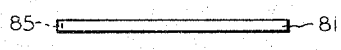
Figure 27:
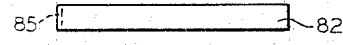
Figure 28:
Figure 29:
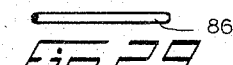

FIGURES 6, 7 and 8 show, respectively, solid inserts 81, 82 and 83, all having the same contour to fit closely in the tank interior, and FIGURES 26, 27 and 28 show the same inserts to each have a different thickness.

Each insert has a vertically disposed air duct groove 85 to facilitate the rapid entry and equalization of compressed air in pressure tank crevice areas, and to allow inserts to be more easily placed into and removed from tank. All solid disc areas of the inserts have very slight convex or tapered equivalent form, to allow rapid entry and equalization of compressed air and eliminate air pockets at junctions.

Some smaller sized watches may have strap or bracelet end lugs too large for the watch to be placed in container insert 76. They may be placed in insert 77, however, and a solid insert 86, of smaller diameter, shown in FIGURES 9 and 29, placed over the watch in the hollowed-out portion 80. Usually two of the solid inserts used with one container insert, as shown in FIG. 18, will bring the gas-permeable space around the watch to a satisfactory minimum.

In FIGURES 16 and 17 a disc-like glass index plate 87 is shown having a radially extending index mark 87a etched therein. The index plate has a diameter approximating that of the pressure gage 13 and can be placed on the gage with the mark 87a lying along or in prolongation of the pointer of the gage to record any reading thereof as desired.

Test No. 1—Static pressure differential test

Apparatus 10 is here used to determine whether a leak exists which is large enough to allow air pressurization of the apparatus containing the watch, and air permeable space inside the watch, to be approximately simultaneous and therefore impossible to detect with the subsequently described test #2 which is used to detect small, delayed leaks only. Coupling 23 is detached, the cover of test tank 11 removed, and gate valve 17 opened exposing the entire system to atmospheric pressure.

As a first step, when the watch is at the final stage of assembly or repair and is ready to be sealed, one of the parts having a joint seal with the case such as the back cover, crystal or crown, is left unseated or detached so as to provide a gross leak condition as mentioned above. Watches supposedly sealed, such as those ready for sale or already in customer use, may be provided with a gross leak condition by loosening the back cover or crystal, or removing the stem and crown. The watch including any detached parts is then placed in test tank 11 with the properly selected container and solid inserts.

Cover 19 is replaced, coupling 23 attached, gate valve 17 and exhaust valve 16 closed.

By operating pump 14, the test tank 11, with the watch with opened casing therein, is then subjected to a pressure of between 46 and 50 p.s.i. After observation to ascertain that the pressure is static, pressure is reduced to an exactly selected value, 44 p.s.i. for instance.

The gate valve 17 is then opened and, when the pressure gage pointer has come to rest, the exact pressure reading is noted. If desired, index plate 87 can be placed on top of the pressure gage 13 with its index mark 87a aligned with the pointer of the gage to graphically record the lowered pressure.

Exhaust valve 16 is then opened and the system allowed to reach atmospheric pressure. Next, cover 19 is removed and the watch taken out and supposedly sealed by replacing the back, crystal or stem and crown.

As a second step, the supposedly sealed watch is replaced in the tank, the cover and connector coupling replaced and the same procedure followed. The exhaust and gate valves closed, the pump is again operated and the sealed system brought to the selected pressure of 44 p.s.i.

The gate valve 17 is again opened and when the pressure gage pointer has come to rest, the difference between the pressure drop in this second step test on the supposedly sealed watch and that of the first step test on the unsealed watch is noted. If the pressure drop is identical in the two tests, the watch is not sealed but has a large leak.

No exact relationships are required between the volumes of the watches to be tested and the apparatus components, however, the smaller the volume of the apparatus sealed system, the greater the pressure differentials will be. When the volume of the sealed pressure system excluding the comparator tank and its conduit to the gate valve, is approximately nine times greater than the internal volume of typical 11½ ligne watches tested, and the volume of the comparator tank with its conduit to the gate valve is equal to the volume of the balance of the sealed system containing the watch, a pressure differential of approximately 1½ p.s.i. is common between the unsealed and sealed measurements of Steps 1 and 2.

Maximum pressure differentials are obtained when the comparator tank section of the sealed system is equal in volume to the balance of the sealed system as previously described, making the pressure drops one-half initial value, and the comparator tank volume may be altered plus or minus by adding or removing small metal air displacing balls 50 in order to create pressure drops of one-half initial value for any given watch and volumetric insert combination.

Again, however, no exact volume relationship is required, and if the volume of the comparator tank section of the sealed system is related to the balance of the sealed system within a ratio of 3 to 1, the apparatus will function adequately.

For the purpose of reducing waiting time in detecting slow leaks, affording more sensitive and extensive pressure gage indication and testing at higher pressures up to 50 p.s.i, the next test hereinafter described is an inherent adjunct to Test No. 1.

*Test No. 2—Airflow test*

After completing the second step of Test 1, and ascertaining that no *large* leak exists, the comparator tank gate valve 17 is closed, and with a single pump stroke the watch is quickly subjected to a pressure in excess of a selected minimum value, 47 p.s.i. maximum for instance. The pump 14 illustrated in FIGURE 1 is of sufficient size so that one stroke of the pump is ordinarily enough to create pressures in excess of 50 p.s.i. If the pressure drops from the maximum value attained, but remains constant at a lower value, a *small* leak exists, an airflow having filled the watch with compressed air.

Small leaks in typical 11½ ligne watches will cause a loss of approximately six pounds pressure from 44. A leak of .06 mm. diameter will cause a pressure loss of approximately six pounds in four to five seconds. If the pressure remains constant at the maximum value attained for five minutes, the watch may be regarded as sealed.

In this test as well as in Test No. 1, if a slow leak is indicated by a partial drop in pressure, care should be taken to release the air through exhaust valve 16 very slowly at a rate not to exceed the leak rate, to prevent possible crystal "blowout."

*Test No. 3—Trapped air test*

Watches with bezel design which prohibits crystal "blowout" at up to 50 p.s.i. internal pressure, if requiring approximately a minute or more to fill with compressed air in Test No. 2, may be immediately removed from the pressure tank 11 and the test areas coated with air detection fluid. The fluid coating will bubble at watch leak points. A commercially known air detection fluid comprises a nonaqueous, substantially viscous, liquid which forms into small bubbles in the presence of such leaks.

*Test No. 4—Water pressure test*

Apparatus 10 may also be used for testing a watch case from which the movement has been removed. All inserts are removed from test tank 11, and the tank filled about one-half full of water, and the supposedly sealed watch case placed in the water crystal up as shown in FIGURE 33.

When cover 19 has been replaced, with gate valve 17 closed, the interior 21 of the tank is subjected smoothly to a low pressure, 2½ p.s.i. for instance. If there is no discernible pressure drop after a short interval, the pressure is smoothly increased to 5 p.s.i., and the gage again observed for a slight pressure drop. The pressure may be carefully increased in 2½ pound stages in this manner until a slight pressure drop is noted.

Exhaust valve 16 is immediately opened when there is a pressure drop so as to limit the entry of water to trace amounts which will cling to the inside of the case at leak points. Cover 19 is removed and a cursory inspection of the watch case is made through the crystal while the case is still in the water. The case may then carefully be removed for closer examination through the crystal.

As an alternate method of causing only trace entry of water which will cling to the inside of the case and locate leak points, the case may be placed in water as above and the exhaust valve 16 opened enough to allow a 50 p.s.i. pressure to drop to zero in a split second interval. With a single swift pump stroke, the pressure is increased to an approximate 50 p.s.i. peak from which it instantly and automatically drops to zero; the entire change in pressure from zero to 50 p.s.i. and then to zero, all occurring in a fraction of a second. Variations in pressure time and intensity may be made as necessary.

*Test No. 5—Internal air pressure test*

FIGURE 10 shows an accessory for use in still another test which can be performed by the apparatus 10 of FIGURE 1. A screw-in nipple 88, which may be inserted in the passage 48 of comparator tank 43 in place of plug 47, has a length of plastic tubing attached to it. The tubing 89 has an inside diameter such that it can be forced down over the crown tube of most watches after the stem and crown have been removed.

Watch leaks detected with Tests 1 and 2 can be located by attaching the nipple 88 to the comparator tank 12, and the tubing 89 to the crown tube of the watch as shown in FIGURE 30. Gate valve 17 is closed and test 11 pressurized to approximately double the test pressure desired. Gate valve 17 is then opened causing the pressure to instantly drop to approximately one-half initial value. If the pressure remains constant, the crystal and back cover, etc., do not leak and the leak indicated by Test 1 and 2 can be, therefore, only at the crown seal. If the pressure does not remain constant but drops, the test areas of the watch are coated with air detection fluid which will bubble at leak points. When these leaks are eliminated, the watch is subjected to Tests 1 and 2 which then function as specific tests for the crown seal. Watches having joint leaks only, and having sealed joints only at the crystal and crown, may be internally pressurized as above, and if the pressure does not remain constant, the leak is at the crystal joint. When the pressure does remain constant, a leak indicated by Tests 1 and 2 locates the leak therefore at the crown. Thus, pertinent to watches with one piece cases as aforementioned, leaks may not only be detected, but located as well without the use of liquids.

Test 5 may also be employed for testing the watch case only, using water instead of air detection fluid. After subjecting the case to pressure through tubing 89, the case is placed under water in any transparent glass receptacle. Air bubbles will escape from leak points.

Watches not having crown tubes, or having special type crown joints may be tested in this manner by employing appropriate adaptors not shown, at the end of tubing 89.

When desirable, crowns with or without stems attached may be tested independently of any watch case by inserting a new spare crown tube of appropriate dimensions partly into the free end of accessory tubing 89. The crown is then pushed on the protruding section of the tube and air pressure applied as in the Test 5 description above, for watches.

A drop in pressure indicates a leak at the crown seal. Leaks may be further checked and examined by applying air detection fluid to the crown and tube joint area, or by the water submersion of the crown and end of tubing 89 in a transparent receptacle. Bubbles will appear at leak points.

Vacuum tests

FIGURE 11 shows other apparatus 90 which is used in vacuum testing to find the location of leaks detected by Tests Nos. 1 and 2.

A testing tank 91 comprises a transparent glass receptacle 92 and a sealable screw-on cover 93. A nipple 94 is secured in the cover and connected to one end of a length of plastic tubing 95 so that the tubing is in air communication with the interior of tank 91.

The other end of the tubing 95 is operatively connected to the T 96. T 96 is also connected to the conventional vacuum gage 97 and to an O-ring washered combination manual valve and nipple 96a, to which is attached another length of tubing 98. Tubing 98, in turn, is connected to another length of tubing 99 through a check valve 100. Tubing 99 is connected at its other end to O-ring washered nipple 101a to which bicycle type vacuum pump 101 may be screwed.

Check valve 100 is constructed to leak air slowly. As best seen in FIGURE 21, the body 102 comprises a thin-walled tube near one end of which is secured the tubular valve seat member 103 having a tapered seat 104. A steel ball 105 is loosely secured in tube 102 adjacent the seat 104 by bending over the end 106 of the tube 102. Ball 105 and seat 104 are both of metal, the surface finishes such that the valve has a normally slight leak rate which functions to reduce the vacuum from maximum to zero slowly and automatically when pump action is stopped during Test No. 6 hereinafter described.

Test No. 6—Air detection fluid test

A supposedly sealed watch W is coated with the aforementioned air detection fluid and placed in the transparent test tank 91 as shown in FIGURE 32. By pumping the vacuum pump 101, an increasingly greater vacuum may be created, up to and exceeding 24 inches of mercury. Leaks can be located by a bubbling action of the coating of test fluid as air is withdrawn from the watch. To minimize possible trace entry of test fluid into the watch with the air backflow when vacuum is dropped, the pump 101 may be unscrewed from nipple 101a and the vacuum allowed to fall to zero slowly and automatically through bleeding check valve 100. Vacuum may be reduced at a faster rate when desirable, by slightly unscrewing manual nipple-bleed valve 96a.

Test No. 7—Vacuum and water test

A similar leak-locating test for the case only may be performed using apparatus 90 with the tank 91 partially filled with water.

The case C is placed under water as shown in FIGURE 31. When a partial vacuum is created in the tank, escaping air bubbles will indicate the location of leaks.

When it is desirable to maintain a given vacuum for an extended time such as required to perform Federal Trade Commission Tests, pump 101 may be operated until maximum attainable vacuum intensity is reached, the pump promptly detached, and a cap nut (not shown) screwed on O-ringed nipple 101a, sealing the end of tubing 99. Vacuum may then be decreased if necessary by carefully opening nipple-bleed valve 96a.

Alternatively, two tanks 91, one kept partially filled with water, may be supplied with apparatus 90.

Test No. 8—Internal vacuum test

For testing joint seals of watches having one piece cases, without liquid, tubing 89 of FIGURE 10 is detached from nipple 88 and attached to adaptor nipple 94a of FIGURE 34. Tubing 95 is detached from nipple 94 and attached to the other section of adaptor nipple 94a. The free end of tubing 89 may now be pushed over the crown tube of the watch and the vacuum pump 101 operated until a desired vacuum intensity is reached. The pump is then promptly unscrewed from nipple 101a and a cap nut screwed on to seal the end of tubing 99. A dropping pressure indicates a crystal joint leak. The crown may be tested by being placed on a new spare crown tube of appropriate dimensions, and the other end of the tube pushed into the free end of tubing 89. The pump may again be operated to create a given vacuum intensity, and then be detached from nipple 101a which is quickly sealed with the cap nut. A dropping pressure indicates a crown seal leak.

Combined pressure and vacuum apparatus

It will be understood that apparatus 10 and apparatus 90 are adapted for use in factory test rooms or repair shops where the apparatus remains ready for use on its own table or shelf and multiplicity of parts is not a drawback. Modified apparatus 105, of a portable nature, is diagrammatically shown in FIGURE 18 embodying parts used in both apparatus 10 and apparatus 90, and capable of performing Tests 1–8 inclusive.

A test tank 106 comprises a transparent "Lucite" or "Plexiglas" receptacle 107, designed to withstand pressures exceeding 50 p.s.i., and a metal cover 108 threadedly securable to the receptacle. "Neoprene" washer 20 between cover and receptacle insures sealed engagement therebetween and the interior 109 of the tank is adapted to receive selected ones of the inserts 76–83, inclusive, as shown and described above in connection with apparatus 10.

Nipple 22 is secured in the cover 108 in air communication with the interior 109 and screw coupling 23 connects the nipple to the brass tube 24 which, at its other end, is connected to the T 26. T 26 is connected through the nipple 31 to the gate valve 17. From valve 17, the tube 42 extends through a joint 25 and leads to the interior of comparator tank 12.

From the other leg of T 26 a brass tube 110 leads to nipple 28 in cross 30 as shown.

One leg or passage of the cross 30 is connected by the nipple screw cap 54 to the combination pressure and vacuum gage 111. Another passage has the exhaust valve 16 therein and the other two passages are connected to gate valves 112 and 113, respectively.

Gate valve 112 is connected through the check valve 15 to a pressure hose 114 leading to a source of pressure, not shown.

Gate valve 113 is connected by a nipple 115 to a flexible tube 116 which, in turn, is connected through the bleeder check valve 100 to another flexible tube 117 which leads to a source of vacuum, not shown.

It will be noted that the apparatus 105 is substantially that of the apparatus 10 except that, by the addition of gate valves 112 and 113, the system may be subjected alternatively to vacuum or pressure as desired. A single hand pump may be supplied which is attachable alternatively to the ends of tubes 114 or 117 and which is capable of pumping air in either direction by the reversal of its check valves.

Since the test tank 106 is transparent, no other vacuum tank need be supplied and the tank may be subjected to vacuum by closing gates 17 and 112 and opening the gate 113. Pressure is supplied, of course, by closing gate 113 and opening gate 112.

It will be apparent that the apparatus 105 is capable of performing Test Nos. 1–8, inclusive, described above, and provides means for testing waterproof and water-resistant watches for leaks by tests without the use of liquids. The same apparatus, moreover, may be used for other tests to locate the leaks, some of the latter tests being for watch case only since they involve the use of liquids.

It will also be apparent that Test No. 1 may frequently be shortened by eliminating the first step where the unsealed watch or an identical watch has already been tested and the data recorded. The second step of Test No. 1 may always be combined and performed together with Test No. 2.

The following schedule is an indication of suggested tests in different situations:

*New watches*

(a) Use Tests No. 1 and No. 2.
(b) Locate detected leaks with Test Nos. 5 or 6.
(c) Other locating tests optional.

*Minor service or regulations requiring watch to be opened*

(a) Use Tests No. 1 and No. 2.
(b) Locate detected leaks with Test Nos. 5 or 6.
(c) Other locating tests optional.

*Watch overhaul*

(a) Use detecting and locating Test No. 7 at the repair bench while the movement is removed, and the entire case made a test area by being water submerged.
(b) Make necessary repairs and retest.
(c) When the watch is cased ready for delivery, make Tests Nos. 1 and 2.
(d) Should any leaks now be detected, locate them with Test No. 5.
(e) Use other test options as necessary.

As will be understood by those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. Apparatus for testing watches, comprising: a sealed test tank having an interior capacity larger than the watch tested, a source of gas under pressure, a pressure gage, a sealed comparator tank of approximately the same volume capacity as the test tank, conduit means connecting the tanks and gage to the pressure source including a T connection between the gage and the two tanks, a gate valve between the T and the comparator tank, and an exhaust valve between the pressure source and the tanks, the comparator tank having second conduit means communicating therewith including a flexible tube fitting tightly over the crown tube of the watch to be tested, whereby the test tank may be subjected to pressure, the watch covered wih leak-detecting fluid and then the gate valve opened to supply gas under pressure to the interior of the watch.

2. The method of testing waterproof watches for a leak comprising the steps:

first, placing the watch unsealed in a pressure tank having an air permeable interior space generally approximating that of the space occupied by the watch;

second, raising the air pressure in the tank to a chosen static pressure;

third, releasing air from the tank into a second tank having approximately equal interior space as the first tank until the pressure in the two tanks is the same while measuring the pressure drop in the first tank;

fourth, sealing the watch and repeating the first three steps with the watch in the first tank; and fifth, comparing the respective pressure drops, no change in pressure drops indicating a leak.

3. Apparatus for performing a variety of pressure and vacuum tests for watches, comprising: a transparent test tank having a removable cover, a comparator tank, a central sealed chamber having a plurality of passageways, a combined pressure and vacuum gage in sealed communication with one of said passageways, a regulatable exhaust valve in communication with another passageway, a source of air pressure in communication with another passageway through a check valve and a first gate valve, a source of vacuum in communication with another passageway through a bleeder-type check valve and a second gate valve, a conduit means in communication with the transparent tank through its cover and in communication with another passageway, the comparator tank being in communication with the first tank through a third gate valve, and a plurality of inserts adapted to be selectively chosen and fitted within the test tank, said inserts having cutout portions of different sizes for containing different watches and providing the least possible air permeable space around the watch in the test tank, whereby the second gate valve may be closed and the first gate valve opened for pressure tests and the first gate valve closed and the second opened for vacuum tests.

4. Apparatus for pressure testing waterproof watches, comprising: a sealed test tank having a removable cover, a sealed comparator tank having conduit means including a gate valve operatively connecting the interiors of the two tanks, a central pressure chamber having a plurality of passages leading thereto, conduit means operatively connecting the test tank with the chamber through one passage, a pressure responsive gage operatively connected to another passage for recording a pressure drop when air under a known pressure is released through the gate valve from the test tank to the comparator tank, a regulatable exhaust valve in another passage, a controllable source of air under pressure, conduit means including a check valve operatively connecting the source to another passage for subjecting a watch in the test tank to a chosen pressure, the test tank having a plurality of space displacing solid inserts selectively chosen and placed in the test tank around the watch for providing a limited gas permable space around the watch, whereby the gage reading of a pressure drop for an unsealed watch in the test tank differs measurably from that from the same test on a sealed watch.

References Cited

UNITED STATES PATENTS

| | | | |
|---|---|---|---|
| 2,113,686 | 4/1938 | Gift | 73—149 X |
| 2,304,731 | 12/1942 | Fairbairn | 73—149 X |
| 2,346,423 | 4/1944 | Gray. | |
| 2,401,368 | 6/1946 | O'Connell et al. | 73—49.3 |
| 2,567,215 | 9/1951 | Lacks | 73—45.5 |
| 3,060,735 | 10/1962 | Baker | 73—149 |

FOREIGN PATENTS

| | | |
|---|---|---|
| 905,080 | 9/1962 | Great Britain. |
| 302,970 | 1/1955 | Switzerland. |

LOUIS R. PRINCE, *Primary Examiner.*

J. NOLTON, *Assistant Examiner.*